(12) United States Patent
Thise

(10) Patent No.: US 9,869,203 B2
(45) Date of Patent: Jan. 16, 2018

(54) AXIAL TURBOMACHINE BLADE WITH PLATFORMS HAVING AN ANGULAR PROFILE

(71) Applicant: Techspace Aero S.A., Herstal (Milmort) (BE)

(72) Inventor: Frederick Thise, Wonck (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 905 days.

(21) Appl. No.: 14/098,395

(22) Filed: Dec. 5, 2013

(65) Prior Publication Data

US 2014/0161597 A1  Jun. 12, 2014

(30) Foreign Application Priority Data

Dec. 7, 2012 (EP) ..................... 12195999

(51) Int. Cl.
 *F01D 25/02* (2006.01)
 *F01D 25/14* (2006.01)
 *F02C 7/047* (2006.01)

(52) U.S. Cl.
 CPC ............ *F01D 25/14* (2013.01); *F01D 25/02* (2013.01); *F02C 7/047* (2013.01); *Y02T 50/672* (2013.01)

(58) Field of Classification Search
 CPC ......... F01D 25/02; F01D 25/10; F01D 25/12; F01D 25/14; F02C 7/047; F02C 7/14
 See application file for complete search history.

(56) References Cited

U.S. PATENT DOCUMENTS

| 4,860,534 A | 8/1989 | Easley et al. | |
| 7,131,612 B2 * | 11/2006 | Baptist | B64D 15/06 244/134 B |
| 8,205,426 B2 * | 6/2012 | Schilling | F01D 25/14 244/134 R |
| 2010/0236213 A1 | 9/2010 | Schilling | |
| 2012/0192544 A1 * | 8/2012 | Roby | F01D 25/02 60/226.1 |

FOREIGN PATENT DOCUMENTS

| EP | 1942249 A2 | 7/2008 |
| EP | 2075194 A1 | 7/2009 |
| GB | 2442967 A | 4/2008 |

OTHER PUBLICATIONS

Search Report dated Feb. 14, 2013 for EP 12195999.3.

* cited by examiner

*Primary Examiner* — Justin Seabe
(74) *Attorney, Agent, or Firm* — James E. Walton

(57) ABSTRACT

The present application relates to a splitter nose of an axial turbomachine designed to separate an annular flow into the turbomachine into a primary flow and a secondary flow for undergoing a thermodynamic cycle. The nose includes a de-icing device with a wall defining, at least partially, an annular channel. A hot oil stream created by the turbomachine circulates in this latter. The oil runs through the circular nose and de-ices it while itself getting cooled. The wall is located so as to form the leading edge of the said splitter nose. The wall is an open or closed strip such as a tube which can be fixed by bonding, welding or recessing. The present application also relates to a multi-flow turbomachine with splitter noses fitted with de-icing devices.

14 Claims, 4 Drawing Sheets

AXIAL TURBOMACHINE BLADE WITH PLATFORMS HAVING AN ANGULAR PROFILE

This application claims priority under 35 U.S.C. §119 to European Patent Application No. 12195999.3, filed 7 Dec. 2012, which is incorporated herein by reference for all purposes.

BACKGROUND

1. Field of the Application

The present application relates to dual-flow axial turbomachines. More specifically, the present application relates to the splitter nose of a dual-flow axial turbomachine, the nose splitting the incoming airflow into a primary and a secondary flow. More precisely, the present application relates to de-icing the splitter nose.

2. Description of Related Art

In order to optimise their thrust jet engines have several annular airflows. A primary flow passes through a compressor and a combustion chamber and is then expanded in a turbine. A secondary flow bypasses the compressor, the combustion chamber and the turbine, and then rejoins the main flow at the outlet of the jet engine. The flows are separated by a splitter nose located upstream of the compressor. Its shape enables it to divide the airflow entering the turbomachine and restricts entry to the compressor. Being located downstream of the blades of the inlet fan, it is exposed to the ingestion of foreign objects.

The air entering the turbomachine is at the atmospheric temperature at the splitter nose. These temperatures can drop to −50° C. at altitude. In the presence of moisture, ice can form on the nose. During flight, this ice can expand and build up into blocks at the tips of the compressor stator blades.

These blocks can change the geometry of the nose and affect the flow of air entering the compressor, which can reduce performance. As they increase in size the blocks can become particularly heavy. Thereafter, they may break off and be ingested by the compressor, which could damage the rotor and stator blades. This ingestion is particularly damaging as it has not first passed through the inlet fan.

To limit such ice formation, splitter noses are fitted with de-icers.

U.S. Pat. No. 6,561,760 B2 discloses a system for de-icing the splitter nose using exhaust gases. The nose is formed of an outer wall and an outer shell. The latter supports an annular row of stator blades. The splitter nose comprises a circular slit which houses an upstream edge of the outer shell. The slit interface is made so as to form axial channels through the thickness of the elements. These channels allow exhaust gas to circulate, which has the effect of heating the leading edge of the splitter nose. The latter is thus well protected against ice formation. However, this solution requires complex machining operations. Efficiency is mainly concentrated in the channels and depends on the thermal conductivity of the materials. It would be difficult to choose another material, say a stronger or lighter one, if the thermal conductivity is low. Also, this system requires that a portion of the exhaust gases from the jet engine are discarded.

Another known solution is to use oil that needs to be cooled to do the de-icing. This oil can be engine oil or actuator oil the control of whose temperature maintains the turbojet and keeps it operating in optimum conditions.

Patent EP 2075194 A1 discloses an oil-air heat exchanger for cooling the oil in a jet engine. The heat exchanger comprises an oil circuit arranged inside the splitter nose. The circuit may be located on an inner face of the splitter nose or in its thickness. This system allows the nose to be de-iced effectively while cooling the oil. This exchanger is, however, complicated to implement. Its effectiveness can be reduced at the upstream end of the splitter nose when this is thick, for example for reasons of mechanical strength.

Patent EP 1942249 A2 discloses a system for transferring heat to a turbomachine. The system comprises a set of pipes extending around the perimeter of the splitter nose of the turbomachine. On its perimeter, the pipes are housed in an annular cavity between the walls delimiting the primary and secondary flows. The pipes are mechanically protected. As they are pressed against the wall defining the secondary flow, they enable heat conduction that promotes defrosting. However, the effectiveness of the pipe is reduced at the leading edge of the splitter nose due to the distance which separates them. The tip of the nose is massive, and therefore has a high thermal inertia. When the system must operate in a discontinuous manner, it is less responsive. Due to variations in thickness of the elements in the vicinity of the pipe, one part may be cold while another is hot, or at least at a temperature well above what is required for defrosting. The operation of such a system is not homogeneous. Also, the tube is located primarily in the upper or outer part (with respect to the axis of rotation of the machine) of the nose. It is less effective in the lower part (or internal), and may allow ice to develop on the outer shell of the stator.

Although great strides have been made in the area of dual-flow axial turbomachines, many shortcomings remain.

DETAILED DESCRIPTION OF THE PREFERRED EMBODIMENT

Figure 1:
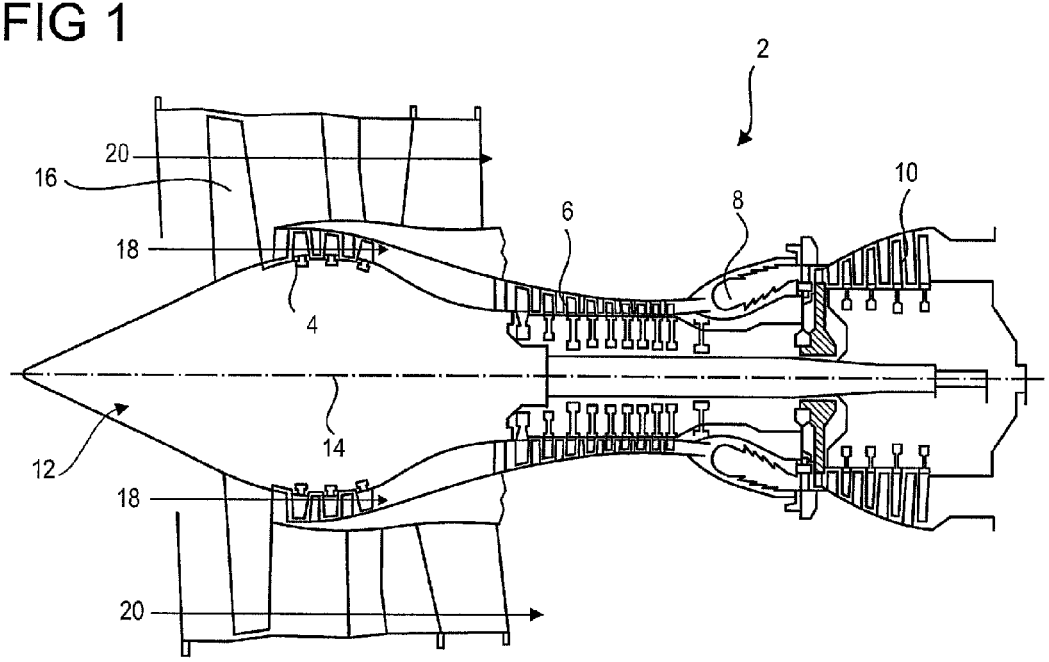
FIG. 1 shows an axial turbomachine in accordance with the present application.

The present application aims to solve at least one of the problems presented by the prior art. The present application aims to The present application aims to solve at least one of the problems presented by the prior art. The present application also aims to improve the effectiveness of an oil de-icing system in the upstream part of a splitter nose. The present application also aims to improve the effectiveness of an oil de-icing system upstream of the first stator stage. The present application also aims to lighten a splitter nose fitted with an oil de-icing device. The present application also aims to lighten the splitter nose.

The present application relates to a splitter nose of an axial turbomachine designed to separate an annular flow into the turbomachine into a primary flow and a secondary flow, the nose comprising:
- an annular leading edge;
- guide walls for the primary and secondary flows, extending from the leading edge; and
- a leading edge de-icing channel extending annularly along the said edge, the channel being designed to conduct a fluid;
- wherein the channel comprises a wall forming the leading edge.

According to an advantageous embodiment of the present application, the fluid comprises air, a gas, oil or a combination of at least two of these.

According to an advantageous embodiment of the present application, the cross-section of the de-icing channel has a closed contour, the guiding surfaces for the primary and secondary flow being secured to the said wall.

According to an advantageous embodiment of the present application, the closed contour has a circular or elliptical profile, the major axis of the ellipse being inclined upstream and the centre of the turbomachine in relation to the main flow axis of the nose, the inclination preferably being between 5° and 30°.

According to an advantageous embodiment of the present application, the cross-section of the de-icing channel wall has an open contour forming an annular cavity with at least one of the guide walls of the primary and secondary flow, preferably with the guide wall of the secondary flow.

According to an advantageous embodiment of the present application, the de-icing channel wall has a variable thickness, the thickness being preferably reduced at an upstream part of the channel.

According to an advantageous embodiment of the present application, the de-icing channel wall is recessed into one or at least one of the primary and secondary stream guide walls, the recessing preferably being discontinuous along the annular profile of the leading edge.

According to an advantageous embodiment of the present application, the de-icing channel wall is fixed to at least one of the guide walls of the primary and secondary flow by welding or bonding.

According to an advantageous embodiment of the present application, the splitter nose comprises an intermediate member located between the de-icing channel wall and the body, the intermediate part preferably comprising an insulating material.

According to an advantageous embodiment of the present application, the contour of the cross section of the de-icing channel wall comprises a part with a radius of curvature less than 10.00 mm, preferably less than 5.00 mm, more preferably less than 2.00 mm, even more preferably less than 1.00 mm, the said part forming the upstream end of the leading edge.

According to an advantageous embodiment of the present application, the channel is segmented and comprises at least two segments that substantially pass through the middle of each annular profile of the leading edge, the channel preferably comprising six channel segments, each one substantially passing through one sixth of the said profile.

According to an advantageous embodiment of the present application, the guide wall of the secondary flow forms a body of revolution of the said nose, the primary flow guide wall forming an outer shell of the bladed stator.

According to an advantageous embodiment of the present application, the body comprises a front surface, the de-icing channel wall essentially covering the said surface.

According to an advantageous embodiment of the present application, the splitter nose comprises binding straps, preferably metal, located against the de-icing channel wall and the primary and secondary flow guide walls. The main axes of the straps preferably extend essentially in radial planes passing through the axis of rotation of the machine.

According to an advantageous embodiment of the present application, the upstream part of the primary flow guide wall is connected to the secondary flow guide wall through the de-icing channel wall.

According to an advantageous embodiment of the present application, the nose comprises an annular groove for inserting an upstream edge of the primary flow separation wall, the de-icing channel wall being located upstream of the said groove.

The de-icing channel wall may comprise a metallic material, a polymeric material or a composite material.

The de-icing channel wall is preferably unitary, more preferably being made of the same material.

The present application also relates to an axial turbomachine compressor, comprising a splitter nose designed to separate an annular flow entering the turbomachine into a primary flow and a secondary flow, wherein the splitter nose is in accordance with the present application.

The present application also relates to an axial turbomachine comprising an inlet fan followed by a compressor, wherein the compressor is in accordance with the present application.

Advantageously, the turbomachine comprises a low-pressure compressor and a high-pressure compressor, the de-icing channel is connected to a stream of hot air from the turbomachine, the hot air being preferably taken from the outlet of the high-pressure compressor.

According to one alternative of the present application, the de-icing channel is connected to a lubricating oil and/or cooling circuit in the turbomachine.

In particular embodiments, the present application may comprise one or more of the characteristics disclosed above, singly or in any technically possible combinations.

The present application enables the splitter nose to be de-iced in an optimum manner, especially at its leading edge. Because of this, a larger area of the nose can be de-iced. The heat of the fluid passes though a reduced thickness of material, thereby improving the thermal efficiency of the device. This configuration improves splitter nose de-icing by providing a uniform efficiency on both its two primary and secondary flow separator walls.

This splitter nose architecture is simple. It allows both weight reduction and savings. Various areas of material can be removed compared with a conventional nose. Also, the manufacturing processes can be simplified.

The present application employs the turbomachine's oil to recover heat. The heat transfer fluid can flow in ducts with reduced sections and having elbows. Hot air is particularly fluid, allowing it to flow in small sections. Oil has a high thermal capacity, enabling it to work at reduced temperatures in order to match the characteristics of certain materials.

In the following description, the terms 'inner' or 'outer' and 'internal' or 'external' refer to a position relative to the axis of rotation of the turbomachine.

FIG. 1 shows an axial turbomachine. It is in this case a double-flow turbojet; equally it could be a multi-flow turbojet, for example, with three annular flows. The turbojet 2 comprises a first compression stage, a so-called low-pressure compressor 4, a second compression stage, a so-called high pressure compressor 6, a combustion chamber 8 and one or more turbine stages 10. In operation, the mechanical power of the turbine 10 is transmitted through the central shaft to the rotor 12 and drives the two compressors 4 and 6. Reduction mechanisms may increase the speed of rotation transmitted to the compressors. Alternatively, the different turbine stages can each be connected to compressor stages through concentric shafts. These latter comprise several rotor blade rows associated with stator blade rows. The rotation of the rotor around its axis of rotation 14 generates a flow of air and gradually compresses it up to the inlet of the combustion chamber 10.

An inlet fan, commonly designated a fan 16, is coupled to the rotor 12. It is mounted on a conical hub and generates an inlet airflow which is divided into a primary flow 18 passing through the various stages of the turbomachine mentioned above, and a secondary flow 20 passing through an annular conduit (shown in part) along the length of the machine and then rejoining the main flow at the turbine outlet. The primary flow 18 and secondary flow 20 are annular flows and are channelled through the housing of the turbomachine. To this end, the housing has cylindrical walls or shells that can be internal or external.

Figure 2:
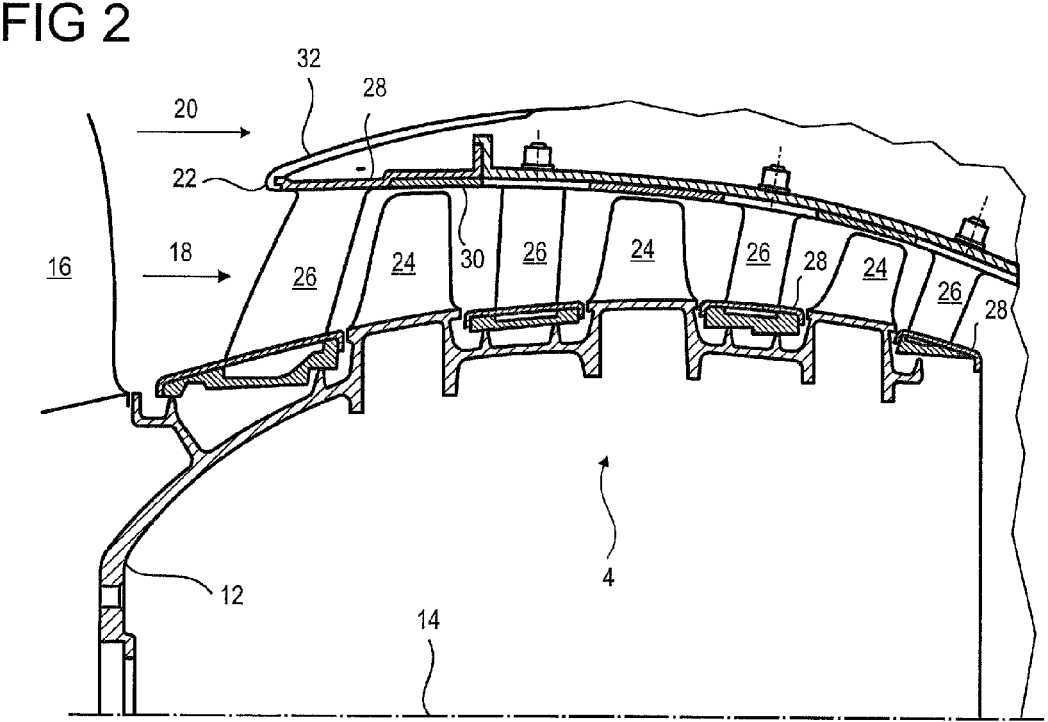
FIG. 2 shows the low-pressure compressor of the turbomachine in FIG. 1.

FIG. 2 is a sectional view of a low-pressure compressor 4 of an axial turbomachine 2 such as that of FIG. 1. Part of the turbofan 18 can be seen, as can the splitter nose 22 between the primary 18 and secondary 20 airflows. The rotor 12 comprises several rows of rotor blades 24, for example three. The low-pressure compressor 4 comprises several stators, for example four, each containing a row of stator blades 26. Stators are associated with a fan 16 or a row of rotor blades for straightening the airflow so as to convert the velocity pressure of the stream into pressure.

The splitter nose 22 is connected to the outer ring 28 of the first stage of the compressor stator. The latter has an inner surface exposed to ice formation. This formation can grow to meet the stator blades 26 of the upstream stator. The outer shell 28 has a structural role and can be used to support a layer of abrabable material 30.

Figure 3:
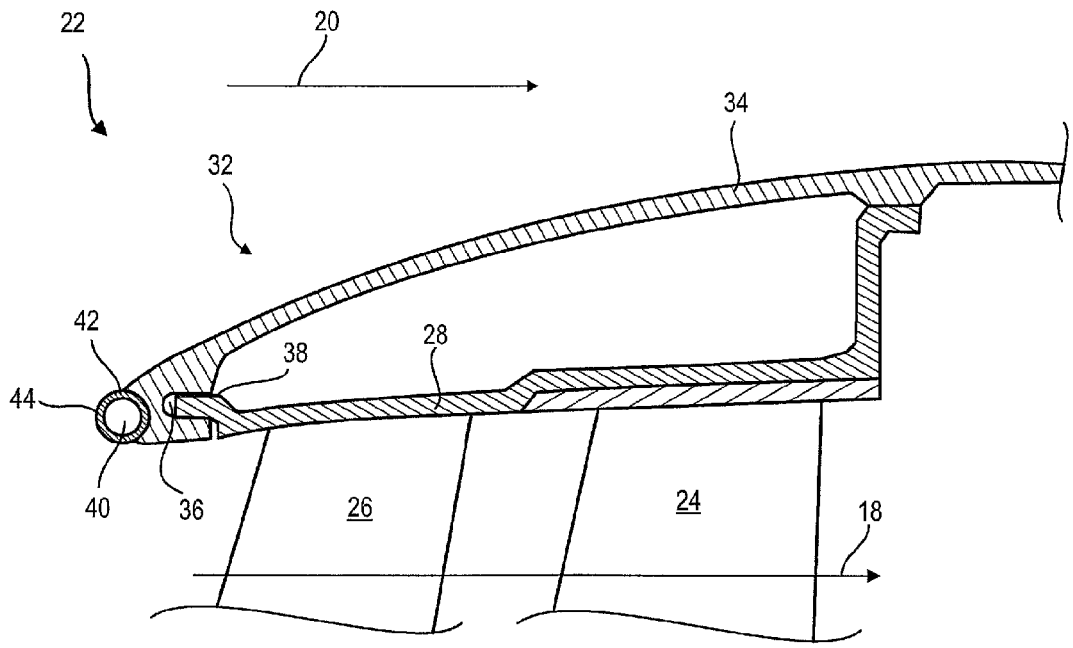
FIG. 3 illustrates a splitter nose of an axial turbomachine according to a first embodiment of the present application.

FIG. 3 illustrates a splitter nose 22 of an axial turbomachine according to a first embodiment of the present application.

The splitter nose 22 is circular in shape. It has a body 32. The latter has a shape of revolution. It comprises an outer wall 34, also of revolution, which is in contact with the secondary flow 20. It is connected to the outer shell 28 of the stator via means of fastening located on its upstream section. Its means of attachment 36 may comprise an annular groove with an axial opening facing downstream. The outer shell 28 may comprise additional means for fixing 38, for example a cylindrical surface designed to mate with the groove 36. The outer shell 28 may also be connected to the outer wall 34 further downstream.

In order to prevent the formation of ice or to make it melt in a discontinuous manner, the splitter nose 22 has a de-icing device. The latter comprises a channel 40 through which a heat transfer fluid, preferably hot air, circulates. This hot gas can come from one of the turbomachine's compressors. Extracting it at the high-pressure compressor provides even hotter air. At the output of the compressor the temperature can reach several hundred degrees, possibly 700° C. This air requires an air bleed circuit that is simple to implement. Warm air can optionally comprise turbomachine exhaust gas.

In one embodiment of the present application, the heat transfer fluid may be the turbomachine's oil. This oil can be used to lubricate or to actuate pistons. The oil can come from a reservoir and pumps used to circulate it. Use of this fluid is sensible because it enables the fluid to be cooled.

The channel 40 has an annular cross-section, and its outer surface is toric. It runs substantially all round the splitter nose 22. The channel 40 may be split into sectors. It can be made up of several channels each passing through part of the splitter nose 22. Joining them enables the complete channel to pass through its entirety.

Each sector can be fed independently. It can pass a flow of oil through it that is then drained through conduits through the body 32. The conduits may be holes made between the outer shell 28 and the outer wall 34. A network (not shown) distributes and discharges the heat transfer fluid before and after its passage through the channel 40. In the case of hot air, it is possible to inject hot air into the primary flow through holes made on the inside of the wall.

The wall 42 is placed so as to be in contact the flow entering the turbomachine, and forming the leading edge 44 which divides the entering flow into a primary flow and a secondary flow. This position means the oil is used as efficiently as possible since it is routed as near as possible to the area where ice forms. Heat is thus conducted without the need to pass through large thicknesses of material that can limit the overall performance.

The wall 42 comprises a tube which may be cylindrical or polygonal. A circular cross section simplifies bending. It can be welded to the body 32 of the splitter nose 22 by brazing. It may also be bonded, which simplifies its replacement in the event of damage. It also embodies a fusible element, which can absorb some impact damage without damaging the body 32. In the event of the tube collapsing, the system remains broadly operational as other sectors allow the oil to circulate and therefore de-icing to take place.

Figure 4:
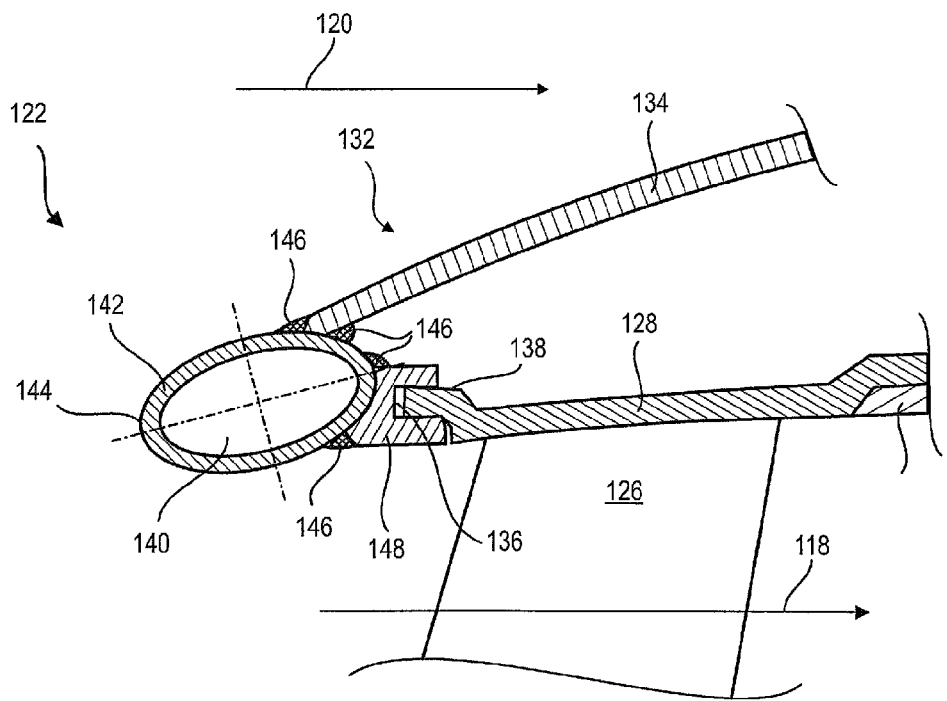
FIG. 4 illustrates a splitter nose of an axial turbomachine according to a second embodiment of the present application.

FIG. 4 illustrates a splitter nose according to a second embodiment of the present application. FIG. 4 has the same numbering scheme as in previous figures for the same or similar elements, but the numbering is incremented by 100. Specific numbers are used for items specific to this embodiment.

The splitter nose 122 comprises a body of revolution 132 with an outer wall 134. It has a de-icing device with a channel 140 defined by a wall 142. The channel 140 travels around the splitter nose 122. The cross section of the wall is profiled. The cross section of the wall 142 and the channel 140 are circular. It may have a flattened portion so as to form a cam shape or an ellipse. The upstream end of major axis of the ellipse or of the cam is inclined inwards. This feature allows the flow to be separated more accurately.

The wall may have a variable thickness, it can be thinner where it is in contact with the flow, and thicker when in contact with the remainder of the nose This design enables the maximum amount of heat to be transferred to where ice may can form, and strengthens the attachment areas. Note that thickening can simplify making a weld.

The wall 142 is first connected to the outer wall 134, and secondly to the outer shell 128. The outer wall 134 may be directly attached to the wall 142 using weld beads 146. The outer shell 128 is itself connected by way of a bracket 148 provided with means of attachment 136. These can be welded to the wall 142 and comprise an annular groove 136. It is designed to mate with a further means of attachment 138 of the outer shell 128.

The wall 142 extends radially from the region of the inner surface of the outer shell 128 to the inner surface of the outer wall 134. Thus, these surfaces are directly protected against ice formation. The wall 142 extends across a suitable length axially, which increases its heat exchange capacity. The blades 126 are thus better protected against ice formation.

Figure 5:
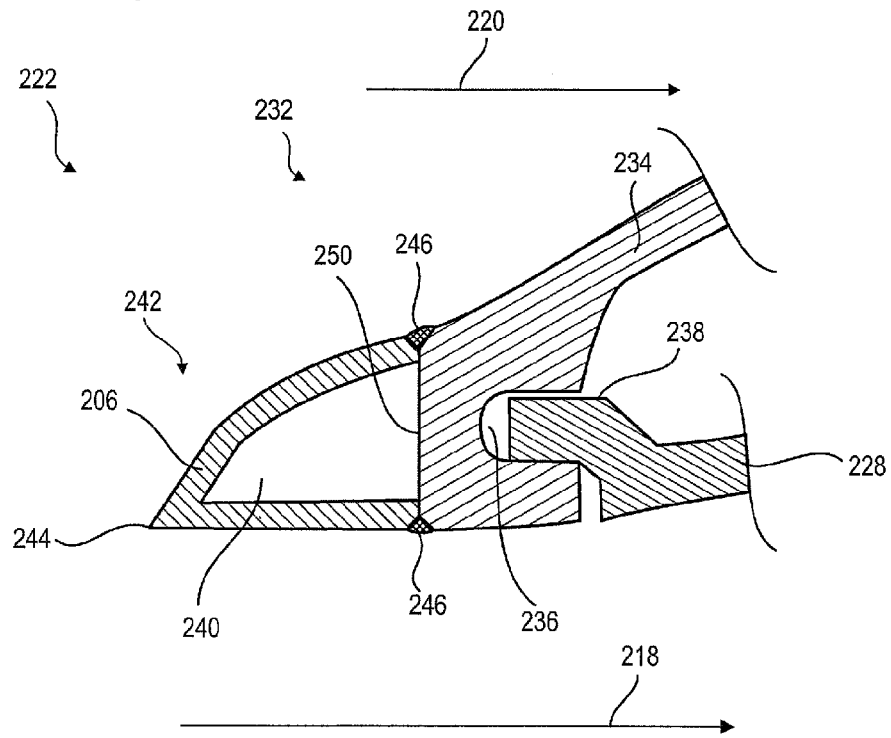
FIG. 5 illustrates a splitter nose of an axial turbomachine according to a third embodiment of the present application.

FIG. 5 illustrates a splitter nose according to a third embodiment of the present application. FIG. 5 has the same numbering scheme as in previous figures for the same or similar elements, but the numbering is incremented by 200. Specific numbers are used for items specific to this embodiment.

The splitter nose 222 comprises a body of revolution 232 with an outer wall 234. It has a de-icing device with a channel 240 defined by a contoured wall 242. The wall 242 may be welded using weld beads 246 sealing the channel 240. The profile of the wall can comprise curved and straight parts, which facilitates constructing any desired geometry. These straight sections improve the overall strength and the curved parts can concentrate the absorption of impact energy by deforming.

The profile of the wall can be closed or advantageously open. The body 232 has a front surface 250 extending generally radially. It contributes to delimiting the channel 240 in combination with the wall 242. This feature saves weight by not having an array of two walls each of which can provide the functions of the other. The front surface 250 forms an essentially plane mounting for the wall 242, and embodies a support surface facing potential impacts. Thus, the wall 242 will be better able to withstand these impacts. The latter can also provide mechanical shielding.

Figure 6:
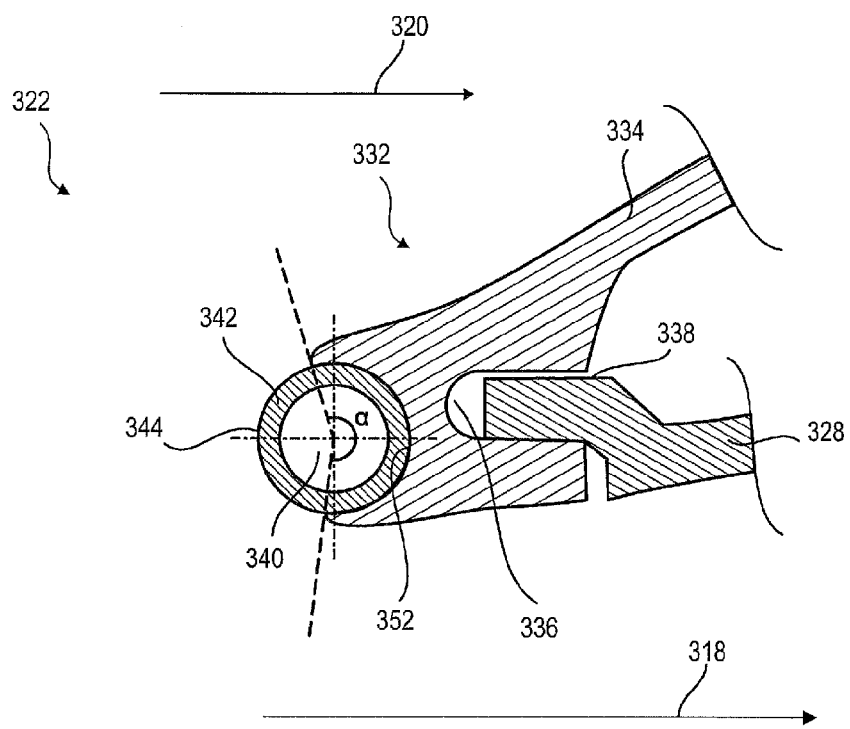
FIG. 6 illustrates a splitter nose of an axial turbomachine according to a fourth embodiment of the present application.

FIG. 6 illustrates a splitter nose according to a fourth embodiment of the present application. FIG. 6 has the same numbering scheme as in previous figures for the same or similar elements, but the numbering is incremented by 300. Specific numbers are used for items specific to this embodiment.

The splitter nose 322 comprises a body of revolution 332 with an outer wall 334. It has a de-icing device with a channel 340 defined by a wall 342.

The body 332 has an annular groove 352 upstream. This groove has a section for mating with another component. It may have a circular shape and describe an angle α greater than 180°, preferably substantially greater than 180°.

Inside the upstream groove 352 a wall 342 is fixed defining an annular channel 340. The profile of the wall can be open, the channel being at least partly embodied by the upstream surface of the groove 352. The upstream annular groove 352 enables the wall 342 to be fitted into the nose 322 by recessing it mechanically. This method of attachment may be discontinuous.

This embodiment of the present application eliminates the need for other means of attachment, such as welding or bonding. Thus it simplifies assembly and/or possible replacement operations. Moreover, it offers more freedom of choice for the respective materials of the wall 342 and the body. Constraints associated with the weldability of different types of alloy are avoided, as are those generated by differential expansion.

Figure 7:
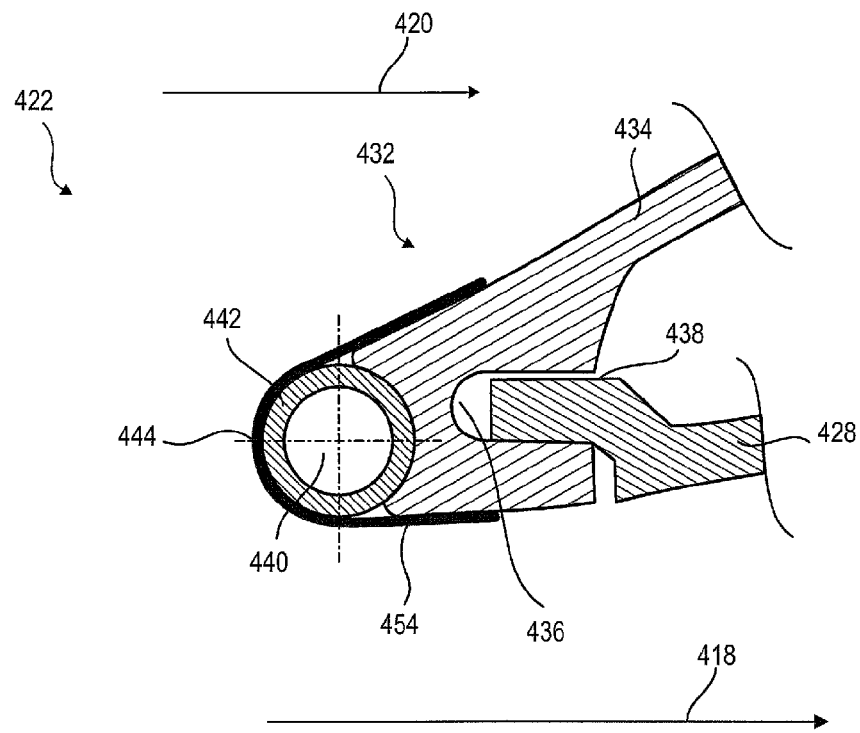
FIG. 7 illustrates a splitter nose of an axial turbomachine according to a fifth embodiment of the present application.

FIG. 7 illustrates a splitter nose according to a fifth embodiment of the present application. FIG. 7 has the same numbering scheme as in previous figures for the same or similar elements, but the numbering is incremented by 400. Specific numbers are used for items specific to this embodiment.

The splitter nose 422 comprises a body of revolution 432 with an outer wall 434. It has a de-icing device with a channel 440 defined by a wall 442, for example a tubular one. [The body 432 has a circular groove on its upstream face in which the wall 442 is held by means of fastening strips 454, made of metal, for example. Between two and thirty and bands 454 spread out circularly can be used.

The fastening strips 454 can hold the wall 442 in the groove by strapping it. They are arranged discontinuously. They are arranged axially and form u or vee shapes that mate with the wall 442. They can be fixed to the body 432, and optionally to the wall 442, by bonding and/or welding. The strips cover the walls, particularly at the leading edge 444. However, they do not reduce the de-icing effect as they are thin and narrow. Their thickness can be between 0.10 mm and 3.00 mm. Their widths can be between 5.00 mm and 40.00 mm. This method of attachment avoids problems with fixing related to material differences between the body 432 and the wall 442. Using strips for fixing simplifies replacing the wall.

Figure 8:
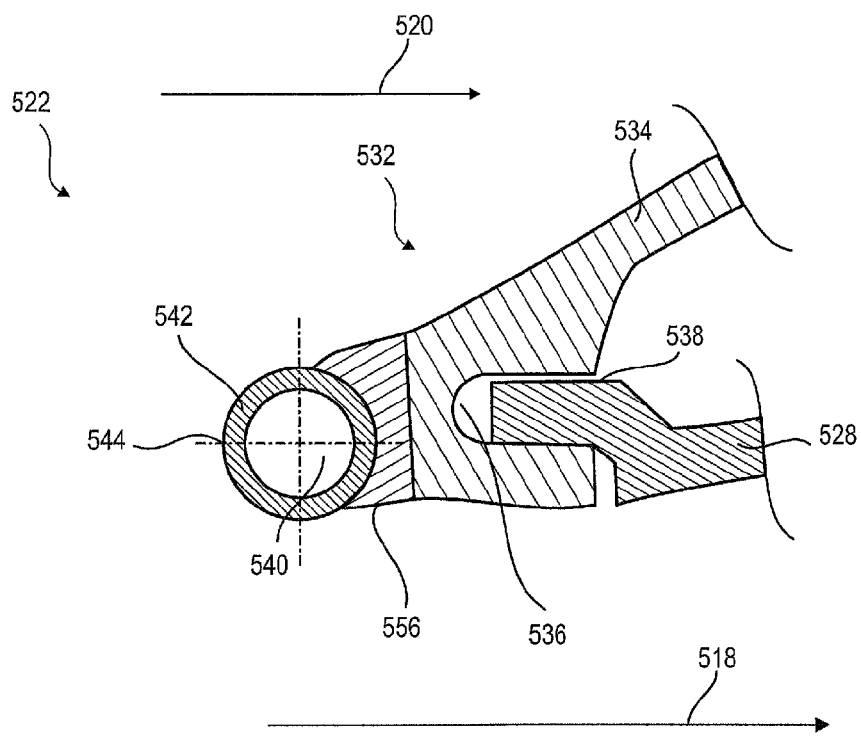
FIG. 8 illustrates a splitter nose of an axial turbomachine according to a sixth embodiment of the present application.

FIG. 8 illustrates a splitter nose according to a sixth embodiment of the present application. FIG. 8 has the same numbering scheme as in previous figures for the same or similar elements, but the numbering is incremented by 500. Specific numbers are used for items specific to this embodiment.

The splitter nose 522 comprises a body of revolution 532 with an outer wall 534. It has a de-icing device with a channel 540 defined by a wall 542, possibly a tubular one. It can be connected to the body 532 via an intermediate part 556. It may be secured to the body 532 and the wall 542 by bonding and/or welding.

The intermediate piece 556 may be made of an insulating material which has a lower thermal conductivity than that of materials of the wall 542 and/or the body 532. It can be made of composite material, optionally with a polymer matrix. It can also be made from ceramic. This feature of the present application allows heat to be concentrated at the leading edge 544, and reduces heat conduction in the guide walls (528, 534). These will be less prone to expansion, and the effectiveness of the de-icing will be increased.

It is possible to implement a de-icing nose with a wall according to the third embodiment of the present application which is attached to a connecting piece according to the sixth embodiment of the present application, the latter having an annular groove according to the fourth embodiment of the present application in which the wall is located. It is also possible to improve the fixing of the wall with fastening bands according to the fifth embodiment of the present application. The fluid used may be air or oil; consideration should be given to providing a means of sealing.

The invention claimed is:

1. A splitter nose of an axial turbomachine for separating an annular flow into a turbomachine into a primary flow and a secondary flow, the splitter nose comprising:
   an annular leading edge:
   guide walls for the primary and secondary flows, extending from the leading edge; and
   a leading edge de-icing channel extending annularly along the leading edge, the channel being configured to conduct a fluid;
   wherein the channel includes a wall forming the leading edge;
   wherein a cross-section of the wall of the de-icing channel has a closed contour; and
   wherein the wall of the de-icing channel is partially housed in a recess formed on the guide walls for the primary and secondary flows.

2. The splitter nose in accordance with claim 1, wherein the closed contour has a circular or elliptical profile, the major axis of the ellipse being tilted upstream and the centre of the turbomachine relative to the main axis of the splitter nose, the inclination being between 5° and 30°.

3. The splitter nose in accordance with claim 1, wherein the wall of the de-icing channel has a variable thickness, the thickness being reduced at an upstream part of the channel.

4. The splitter nose in accordance with claim 1, wherein, the recessing is discontinuous along the annular profile of the leading edge.

5. The splitter nose in accordance with claim 1, further comprising: an intermediate part located between the leading edge and the guide walls of the primary and secondary flows, the intermediate part including an insulating material.

6. The splitter nose in accordance with claim 1, wherein the contour of the cross section of the wall of the de-icing channel comprises:
   a part with a radius of curvature less than 10.00 mm forming the said part forming an upstream end of the leading edge.

7. The splitter nose in accordance with claim 1, wherein the contour of the cross section of the wall of the de-icing channel comprises:
   a part with a radius of curvature less than 5.00 mm forming the said part forming an upstream end of the leading edge.

8. The splitter nose in accordance with claim 1, wherein the contour of the cross section of the wall of the de-icing channel comprises:
   a part with a radius of curvature less than 2.00 mm forming the said part forming an upstream end of the leading edge.

9. The splitter nose in accordance with claim 1, wherein the contour of the cross section of the wall of the de-icing channel comprises:
   a part with a radius of curvature less than 1.00 mm forming the said part forming an upstream end of the leading edge.

10. The splitter nose in accordance with claim 1, wherein the channel is segmented and comprises:
    at least two segments each passing substantially through half of the annular profile of the leading edge.

11. The splitter nose in accordance with claim 1, wherein the guide wall of the secondary flow forms a body of revolution of the splitter nose, the guide wall of the primary flow forming an external wall of a bladed stator.

12. The splitter nose in accordance with claim 11, further comprising:
    fastening strips made of metal, located against the wall of the de-icing channel and the guide walls of the primary and secondary flows.

13. A compressor of an axial turbomachine comprising:
    a splitter nose configured to separate an annular flow entering the turbomachine into a primary flow and a secondary flow, the splitter nose comprising:
      an annular leading edge:
      guide walls for the primary and secondary flows, extending from the leading edge; and
      a leading edge de-icing channel extending annularly along the leading edge, the channel being configured to conduct a fluid;
      wherein the channel includes a wall forming the leading edge;
      wherein a cross-section of the wall of the de-icing channel has a closed contour; and
      wherein the wall of the de-icing channel is partially housed in a recess formed on the guide walls for the primary and secondary flows.

14. An axial turbomachine comprising:
    an inlet fan; and
    a compressor following the inlet fan, the compressor comprising:
      a splitter nose configured to separate an annular flow entering the turbomachine into a primary flow and a secondary flow, the splitter nose comprising:
        an annular leading edge:
        guide walls for the primary and secondary flows, extending from the leading edge; and
        a leading edge de-icing channel extending annularly along the leading edge, the channel being configured to conduct a fluid;
        wherein the channel includes a wall forming the leading edge;
        wherein a cross-section of the wall of the de-icing channel has a closed contour; and
        wherein the wall of the de-icing channel is partially housed in a recess formed on the guide walls for the primary and secondary flows.

* * * * *